United States Patent [19]

Chung et al.

[11] Patent Number: 5,440,417
[45] Date of Patent: Aug. 8, 1995

[54] SYSTEM FOR SPECTRUM-SLICED FIBER AMPLIFIER LIGHT FOR MULTI-CHANNEL WAVELENGTH-DIVISION-MULTIPLEXED APPLICATIONS

[75] Inventors: Yun C. Chung; Jae S. Lee, both of Monmouth; David J. DiGiovanni, Union, all of N.J.

[73] Assignee: AT&T Corp., Murray Hill, N.J.

[21] Appl. No.: 130,962

[22] Filed: Oct. 4, 1993

[51] Int. Cl.$^6$ ............................................ H04J 14/02
[52] U.S. Cl. ................................. 359/134; 359/124; 359/160; 359/179; 359/341; 372/6; 385/24
[58] Field of Search ............... 359/124, 134, 160, 173, 359/179, 341; 372/6; 385/24, 22

[56] References Cited

U.S. PATENT DOCUMENTS 5,331,449  7/1994  Huber et al. .................. 359/134

OTHER PUBLICATIONS

*Japanese Journal of Applied Physics,* vol. 30, No. 7B, Part 2, 15 Jul. 1991, pp. L1282-L1284, Y. Ohishi et al., "Pr3+-Doped Superfluorescent Fluoride Fiber Laser".
*Electronics Letters,* vol. 26, No. 20, 27 Sep. 1990, pp. 1671-1673, P. D. D. Kilkelly et al., "Experimental Demonstration of a Three Channel WDM System Over 100km Using Superluminescent Diodes".
*Electronics Letters,* vol. 24, No. 7, 31 Mar. 1988, pp. 389-390, Reeve et al., "LED Spectral Slicing For Single Mode Local Loop Application".
*Electronics Letters,* vol. 27, No. 3, 31 Jan. 1991, pp. 261-263, H. Fevrier et al., "High-Power, Compact 1.48 μm Diode-Pumped Broadband Superfluorescent Fibre Source at 1.55 μm".
*Journal of Lightwave Technology,* vol. 9, No. 2, Feb. 1991, pp. 147-154, C. R. Giles et al., "Propagation of Signal and Noise in Concatenated Erbium-Doped Fiber Optical Amplifiers".
*Electronics Letters,* vol. 28, No. 13, 18 Jun. 1992, pp. 1212-1213, M. Zirngibl et al., "Efficient 1×16 Optical Power Splitter Based on InP".
*IEEE Photonics Technology Letters,* vol. 5, No. 12, Dec. 1993, pp. 1458-1461, J. S. Lee et al., "Spectrum-Sliced Fiber Amplifier Light Source for Multichannel WDM Applications".
P. D. D. Kilkelly, P. J. Chidgey and G. Hill. "Experimental Demonstration of a Three Channel WDM System Over 110km Using Superluminescent Diodes." Electronics Letters, vol. 26, No. 20 (Sep. 27, 1990), pp. 1671-1673.
M. H. Reeve, A. R. Hunwicks, W. Zhao, S. G. Methley, L. Bickers and S. Hornung. "LED Spectral Slicing for Single-Mode Local Loop Applications". Electronics Letters, vol. 24, No. 7 (Mar. 31, 1988), pp. 389-390.
S. S. Wagner and T. E. Chapuran, "Broadband High-Density WDM Transmission Using Superluminescent Diodes". Electronics Letters.

*Primary Examiner*—David K. Moore
*Assistant Examiner*—Kinfe-Michael Negash

[57] ABSTRACT

The present invention relates to a potentially inexpensive light for multi-channel wavelength-division-multiplexed (WDM) applications. The high-power amplified spontaneous emission (ASE) from a fiber amplifier, which is already in the optical fiber, is efficiently divided into many channels using a WDM demultiplexer. This "spectrum-sliced" ASE is used as light sources for WDM systems rather than several wavelength-selected DFB lasers.

20 Claims, 2 Drawing Sheets

SYSTEM FOR SPECTRUM-SLICED FIBER AMPLIFIER LIGHT FOR MULTI-CHANNEL WAVELENGTH-DIVISION-MULTIPLEXED APPLICATIONS

BACKGROUND OF THE INVENTION

1. Field of the Invention

The present invention relates to a cost efficient spectrum-sliced fiber amplifier light to be used with practical wavelength-division-multiplexed (WDM) systems for both long-distance (~100 km) and local loop applications.

2. Information Disclosure Statement

Recent achievements in optical amplifiers revitalize the practicality of wavelength-division-multiplexed (WDM) systems for both long-distance transmission and local-loop applications. However, WDM systems are envisioned to have a multiple number of transmitter lasers operating at different wavelengths. Thus, these transmitter lasers should be wavelength-selected for each channel and controlled to operate at a specific wavelength to the end of a system's lifetime. However, this process would increase cost and complexity.

There have been a few attempts to overcome this problem by using broadband lights. For example, the broadband light from 1.3-$\mu$m light emitting diodes (LEDs) or superluminescent diodes (SLDs) was "spectrum-sliced" using grating-based demultiplexers and used in WDM systems. Thus, there was no need for wavelength-selecting transmitter lasers and identical LEDs were used for every channel. However, the transmission rates were limited to 2 Mb/s–150 Mb/s over the distances less than 7 km due to the insufficient power inherent in LEDs. Recently, the transmission distance has been extended to 110 km at 140 Mb/s using 1.5-$\mu$m SLDs and an erbium-doped fiber amplifier (EDFA).

M. H. Reeve, A. R. Hunwicks, W. Zhao, S. G. Methley, L. Bichers and S. Hornung, "Led Spectral Slicing For Single-Mode Local Loop Applications", Electronics Letters, Vol. 24, No. 7 (Mar. 31, 1988), pp. 389–390, and S. S. Wagner and T. E. Chapuran, "Broadband High-Density WDM Transmission Using Superluminescent Diodes", Electronics Letters, Vol. 26, No. 11 (May 24, 1990), pp. 696–697, describe "spectrum-sliced" light emitting diodes (LEDs) and superluminescent diodes (SLDs) using grating-based demultiplexers.

Further, an article, P. D. D. Kilkelly, P. J. Chidgey, and G. Hill, "Experimental Demonstration of a Three Channel WDM System Over 110 km Using Superluminescent Diodes", Electronics Letters, Vol. 26, No. 20 (Sep. 27, 1990), pp. 1671–1673, addressing transmission distance using SLDs and an erbium-doped fiber amplifier (EDFA) has been written.

However, none of these articles considers a system for spectrum-sliced fiber amplifier light for multi-channel WDM applications encompassed by the present invention.

SUMMARY OF THE INVENTION

The present invention pertains to the use of broadband light as an inexpensive multi-channel wavelength-division-multiplexed (WDM) light system, based on the following:

(1) obtaining strong amplified spontaneous emission (ASE) in excess of 40 mW from an erbiumdoped fiber amplifier (EDFA), and (2) utilizing integrated optic WDM multiplexers for efficient optical multiplexing.

DETAILED DESCRIPTION OF THE INVENTION

Figure 1:
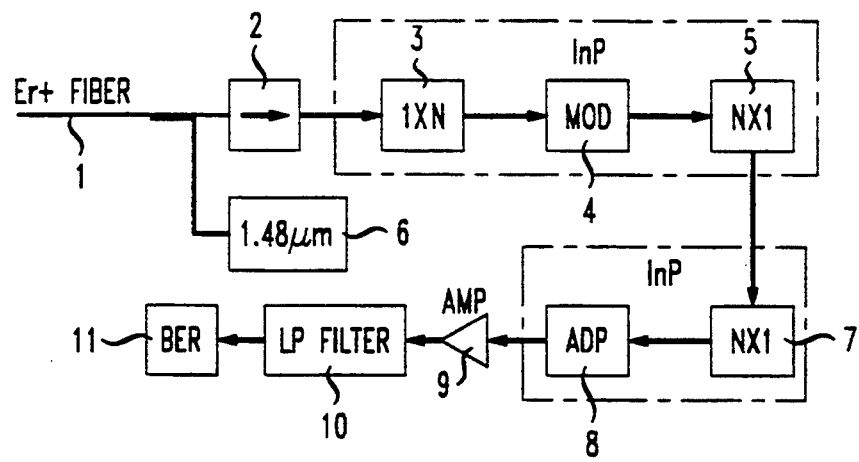
FIG. 1 shows a schematic diagram of the proposed multi-channel WDM light system. MOD is an array of N modulators. An identical wavelength-sensitive 1×N demultiplexer could be used at the receiver end.

FIG. 1 shows the schematic diagram of the proposed WDM light system. The EDFA 1 provides much more powerful ASE light 2 into the single-mode fiber than semiconductor devices (e.g. LEDs, SLDs, or amplifiers). The ASE light 2 is efficiently split into many WDM channels using a wavelength-sensitive 1×N WDM demultiplexer 3, modulated individually, and multiplexed back into a single-mode fiber using a wavelength-sensitive N×1 WDM multiplexer 5. The (de)multiplexers and modulators 4 could be fabricated monolithically on InP substrates. FIG. 1 also shows a system for receiving the spectrum-sliced light including a wavelength-sensitive N×1 WDM demultiplexer 7 and an APD 8, biased at 60 v, for attenuating and detecting the modulated signal. The detected signal is further amplified 9 and filtered with a lowpass filter 10, and then sent to an error detector 11 for the BER measurement. Thus, this simple arrangement with an EDFA (requiring only one pump laser 6) can provide an economical light system for a multiple number of WDM channels.

The detection of ASE light generates spontaneous-spontaneous beat noise, which consists of a dc part arising from the beat between the same optical frequency components and an ac part due to the beat between the different frequency components. Thus, when the ASE is used as a WDM light, we may consider the dc ASE power, $I^2_{ASE}$, as carrier and the time-varying ac part, $I^2_{sp\text{-}sp}$, as noise. These terms are given by $$I^2_{sp-sp} = \frac{2\, I^2_{ASE}\, B_e}{m\, B_o} \quad (2)$$

where, $\eta$ is the detection quantum efficiency, m the number of polarization modes, $n_{sp}$ is the spontaneous emission factor, G is the amplifier gain, $B_o$ is the optical bandwidth, and $B_e$ is the electrical bandwidth of the receiving sysytem. Thus, the signal-to-noise ratio (SNR) of ASE light at the receiver is given by $$SNR = \frac{I^2_{ASE}}{I^2_{sp-sp} + I^2_{shot} + I^2_{ckt}} \quad (3)$$

where, $I^2_{shot}$, and $I^2_{ckt}$ are the noise power produced by the ASE shot noise and the receiver electronics, respectively. Neglecting the electrical noise, it becomes $$SNR \approx \frac{m B_o}{2 B_e} = \frac{B_o}{B_e} \quad (4)$$

since $m=2$ for EDFAs. In traditional LED transmission systems, the spontaneous-spontaneous beat noise is negligible because of the large optical bandwidth. However, it becomes dominant over electrical noise and limits the total transmission capacity, T, when the optical bandwidth per channel is significantly reduced as in the proposed WDM light system. Since the electrical noise is neglected, there is no noise when the ASE light is not present (i.e. for space). Thus, the Q-parameter at the receiver is given by $Q \approx I_{ASE}/\sqrt{I^2_{sp-sp}} = \sqrt{SNR}$. For the Gaussian noise approximation, $Q=7.65$ when the bit-error-rate (BER) is $10^{-14}$. Thus, the corresponding SNR is about 60. The $B_e$ is assumed to be 0.7 times the transmission rate, B. Then, T is given by $$T = NB \approx \frac{B_a}{42M} \quad (5)$$

where, $N(=B_a/MB_o)$ is the number of channels, $B_a$ is
the bandwidth of an EDFA ($\sim 40$ nm), and M is the multiplication factor given by the channel spacing divided by $B_o$. Thus, T is not dependent on the transmission rate of each channel, B. The ultimate value of T would be about 120 Gb/s if the channel spacing is allowed to be as narrow as $B_o(M=1)$. However, the realistic estimation of T would be about 40 Gb/s since the channel spacing should be at least 3 times the $B_o(M=3)$ to avoid crosstalk.

Figure 2:
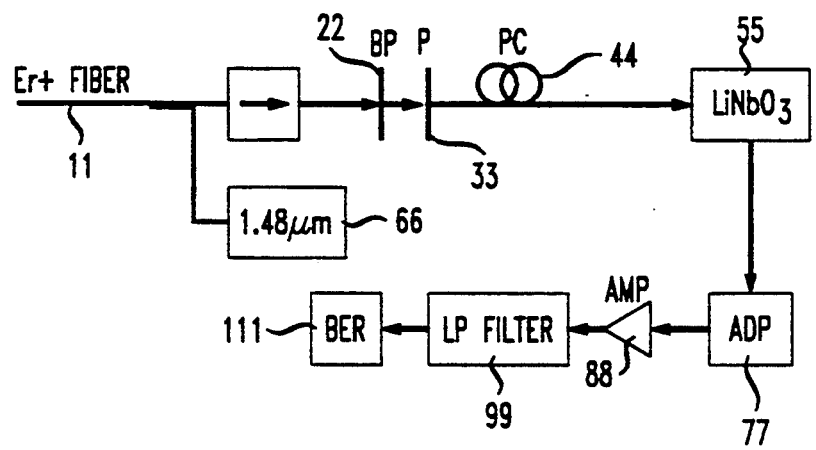
FIG. 2 shows an experimental set-up. BP is an optical bandpass filter (bandwidth; 1.3 nm). P and PC are a polarizer and a polarization controller, respectively.
Figure 3:
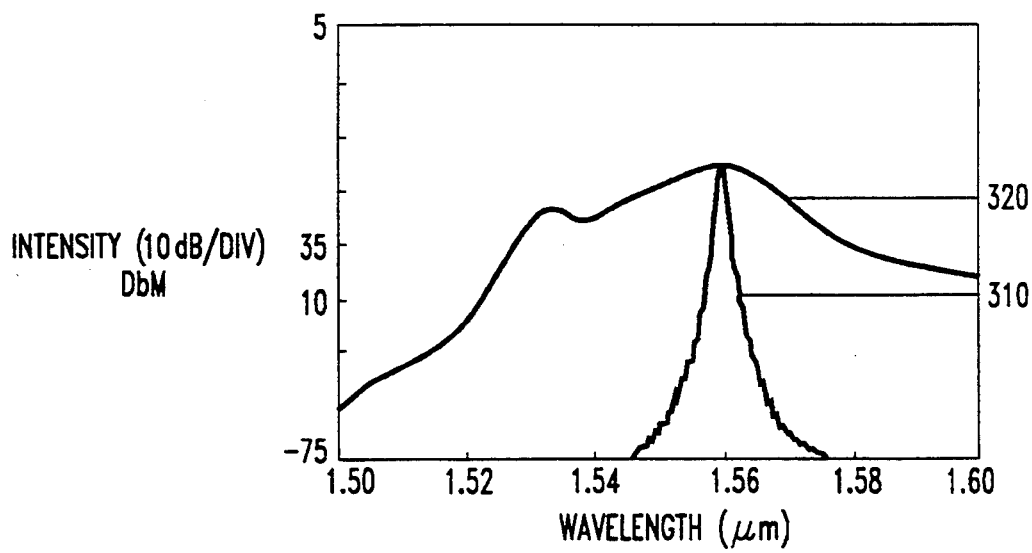
FIG. 3 shows the ASE spectrum of an EDFA with and without the bandpass filter. The backward ASE power was about 21 mW at the pump power of 40 mW. The ASE power within the filter bandwidth (1.3 nm) was about 0.9 mW; and, FIG. 4 shows the measured bit error curves at 622 Mb/s, 1 Gb/s, and 1.7 Gb/s:( ) a 1.5-$\mu$m DFB laser; (o) the spectrum-sliced ASE light (bandwidth; 1.3 nm); (o) the spectrum sliced ASE light (bandwidth; 0.6 nm).

The experimental set up is shown in FIG. 2. A 150-m long erbium-doped fiber 11 was pumped in counterpropagating direction with a 1.48-μm laser 66. The backward ASE power was measured to be about 21 mW at a pump power of 40 mW. An optical isolator ($\sim 30$ dB) was placed at the output of an erbium-doped fiber to suppress lasing. An optical bandpass filter 22 was used to simulate the WDM demultiplexer. The bandpass filter was centered at 1.56 μm and had a 3-dB bandwidth of 1.3 nm. The ASE power within this bandwidth was about 0.9 mW. FIG. 3 shows the ASE spectrum with 310 and without 320 the bandpass filter.

An optical polarizer 33 and a polarization controller 44 were used at the input of the polarization-sensitive LiNbO$_3$ modulator 55, resulting in a 3 dB loss of both the optical ASE power and the SNR (since the number of polarization mode becomes $m=1$). However, these losses would be recovered if the LiNbO$_3$ modulator was replaced with a polarization-insensitive electroabsorption modulator. The ASE light was modulated at 622 Mb/s, 1 Gb/s, and 1.7 Gb/s with a $2^{15}-1$ bit pseudorandom sequence. The modulated signal was attenuated and detected using an InGaAs APD 77. The APD was biased at 60 V. The detected signal was then amplified 88 and filtered with a lowpass filter 99, and sent to an error detector 111 for the BER measurement. The bandwidth of the lowpass filter was set to be about 0.7 times the bit rate, yielding 400 MHz, 700 MHz, and 1.3 GHz.

Figure 4:
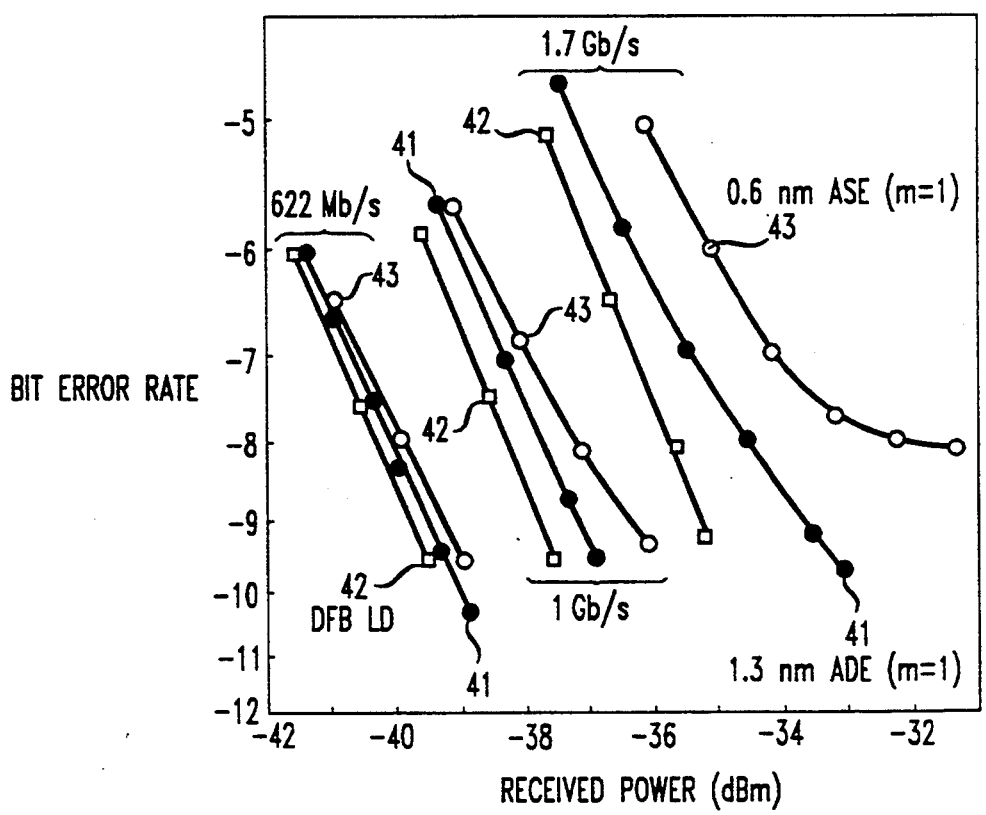

We compared the receiver sensitivity of a system using the spectrum-sliced ASE light and a conventional 1.5-μm DFB laser. The laser wavelength (1.548 μm) was close to the center-wavelength of the ASE light (1.560 μm). FIG. 4 shows the measured BER curves. A 400-MHz lowpass filter was used for 622-Mb/s data. Thus, the SNR of the spectrum-sliced ASE light (bandwidth; 1.3 nm) with single polarization ($m=1$) was estimated to be about 23 dB from equation (4). At 622 Mb/s, the receiver sensitivity was almost identical using the ASE light 41 and the DFB laser 42. For 1-Gb/s data, the electrical bandwidth was increased to 700 MHz, thus the SNR was degraded to about 20.6 dB. The power penalty was measured to be about 0.6 dB at an error rate of $10^{-9}$. The SNR was degraded further to about 17.9 dB for 1.7-Gb/s data due to the increased electrical bandwidth of 1.3 GHz. The power penalty was about 1.6 dB.

We also reduced the optical bandwidth of ASE light to 0.6 nm 43. The SNR was then degraded to about 19.7 dB when a 400-MHz lowpass filter was used for 622-Mb/s data. The resulting power penalty was about 0.5 dB. When this ASE light was used for 1-Gb/s data, the SNR was 17.3 dB and the power penalty was about 1.4 dB. However, for 1.7-Gb/s data, the SNR was degraded to 14.6 dB and an error floor was observed at about $5 \times 10^{-9}$. This is in a good agreement with the theoretically calculated SNR of 15.2 dB for the above error rate. These experimental results confirm the calculated SNR of about 18 dB needed for the error-free transmission (BER=$10^{-14}$). Thus, even the 0.6-nm ASE light could be used for 1.7-Gb/s data if both polarization modes are used ($m=2$). Assuming that the channel spacing is about 3 times $B_o$, we should be able to place twenty-two 0.6-nm channels within the bandwidth of an EDFA. Then, the total transmission capacity, T, is about 37 Gb/s, which is in a good agreement with the estimated capacity of 40 Gb/s from equation (5).

In summary, we propose a potentially inexpensive light system based on an EDFA and an integrated optic WDM demultiplexer for multi-channel WDM applications. The SNR of such incoherent light system depends on the ratio of the optical and electrical bandwidth due to the spontaneous-spontaneous beat noise. Thus, it is necessary to increase the optical bandwidth and/or decrease the electrical bandwidth to improve the SNR, which, in turn, determines the total capacity of a WDM system using such lights. To demonstrate the principle, we filtered the ASE light with an optical bandpass filter (bandwidth; 1.3 nm) and used for the transmission of 622 Mb/s, 1 Gb/s, and 1.7 Gb/s data. The penalty in the receiver sensitivity was negligible at 622 Mb/s and increased with the bit rates. This is because the SNR of the spectrum-sliced 1.3-nm ASE light degraded as wider electrical bandwidth is needed for the system operating at a higher bit rate. The penalty also increased when the optical bandwidth was reduced. These experimental results indicate that the ASE light should have the SNR better than about 18 dB for the error-free transmission (BER$<^{-14}$), as expected from the simple Gaussian noise approximation. From this requirement, we estimate that the realistic capacity of a WDM system using this light would be about 40 Gb/s, assuming the channel spacing should be at least 3 times the optical bandwidth of each channel. The chromatic dispersion would be a lesser problem for these lights than conventional broadband lights such as LEDs due to their relatively narrow optical bandwidth. Thus, we believe that these lights could help the realization of practical WDM systems for both long-distance transmission (~100 km) and local loop applications.

What is claimed is:

1. A system for producing a light for use with a multi-channel wavelength-division-multiplexed (WDM) system comprising:
   (a) a fiber amplifier providing amplified spontaneous emission (ASE) light;
   (b) a laser for pumping said fiber amplifier; and,
   (c) a WDM demultiplexer for receiving and splitting said ASE light, said demultiplexer being connected to an array of modulators, said array of modulators being connected to a WDM multiplexer for combining said ASE light back into an optical fiber, thereby producing a spectrum-sliced light for a multiple number of WDM channels.

2. The system of claim 1, wherein the WDM demultiplexer is a wavelength-sensitive 1×N demultiplexer.

3. The system of claim 1, wherein the WDM multiplexer is a wavelength-sensitive N×1 multiplexer.

4. The system of claim 1, wherein the ASE light, spectrum-sliced for each of said multiple number of channels, has an optical bandwidth, a detected dc part and a detected ac part, the dc part, $I^2_{ASE}$, given by:

$$I^2_{ASE} = \{e\,\eta\,m\,n_{sp}(G-1)B_o\}^2,$$

where, $\eta$ is the detection quantum efficiency, m is the number of polarization modes, $n_{sp}$ is the spontaneous emission factor, G is the amplifier gain, $B_o$ is the optical bandwidth of the spectrum-sliced ASE light and $B_e$ is an electrical bandwidth of a receiving system; and the time-varying ac part, $I^2_{sp-sp}$, is given by:

$$I^2_{sp-sp} = \frac{2\,I^2_{ASE}\,B_e}{m\,B_o}.$$

5. The system of claim 4, wherein the ASE light further comprises a signal-to-noise ratio (SNR) given by:

$$SNR = \frac{I^2_{ASE}}{I^2_{sp-sp} + I^2_{shot} + I^2_{ckt}}$$

where, $I^2_{shot}$ and $I^2_{ckt}$ are the noise power produced by ASE shot noise and the receiving system, respectively.

6. The system of claim 4, wherein the ASE light, when detected, further comprises a signal-to-noise ratio (SNR) given by:

$$SNR = \frac{B_o}{B_e}.$$

7. The system of claim 6, wherein the signal-to-noise ratio (SNR) is about 18 dB.

8. The system of claim 4, further comprising a channel spacing ($B_a/N$), said channel spacing being greater than the optical bandwidth ($B_o$) of the ASE light, with $B_a$ being a predetermined bandwidth of said fiber amplifier and N being a predetermined number of channels.

9. The system of claim 8, further comprising a transmission capacity, T, of the receiving system given by:

$$T = \frac{B_a}{42M},$$

where M is a multiplication factor given by the channel spacing ($B_a/N$) divided by the optical bandwidth ($B_o$).

10. The system of claim 9, wherein the fiber amplifier is an erbium-doped fiber amplifier (EDFA).

11. The system of claim 10, wherein the value of for said EDFA is approximately 40 nm.

12. The system of claim 9, wherein the transmission capacity is approximately 120 Gb/s.

13. A system for producing error free transmission for both long-distance transmission and local-loop applications including:
   I. A spectrum-sliced fiber amplifier light system comprising:
      (a) a fiber amplifier providing ASE light, said ASE light having an optical bandwidth;
      (b) a laser for pumping said fiber amplifier; and,
      (c) a WDM demultiplexer for receiving and splitting said ASE light, said demultiplexer being connected to an array of modulators, said array of modulators being connected to a WDM multiplexer for combining said ASE light back into an optical fiber, thereby producing a spectrum-sliced light for a multiple number of WDM channels; and,
   II. A multi-channel WDM system for receiving said spectrum-sliced light for producing substantially error-free transmission for both long-distance transmission and local-loop applications.

14. The system of claim 13, wherein the multi-channel WDM system has a transmission capacity defined by:

$$T = \frac{B_a}{42M},$$

with $B_a$ being a predetermined bandwidth of the fiber amplifier, M being a multiplication-factor given by a channel spacing ($B_a/N$) divided by the optical bandwidth ($B_o$), and N being a predetermined number of channels.

15. The system of claim 14, wherein the channel spacing ($B_a/N$) is equal to 3 times the optical bandwidth ($B_o$).

16. The system of claim 13, wherein the ASE light has a signal-to-noise ratio (SNR) given by:

$$SNR = \frac{B_o}{B_e},$$

with $B_e$ being an electrical bandwidth of a receiving system.

17. The system of claim 16, wherein the SNR is approximately equal to 18 dB.

18. A light system with a multi-channel WDM system comprising:
   (a) an erbium-doped fiber amplifier (EDFA) providing ASE light, said ASE light having an optical bandwidth;
   b) a laser for pumping said fiber amplifier; and,
   (c) a WDM demultiplexer for receiving and splitting said ASE light, said demultiplexer being connected to an array of modulators, said array of modulators being connected to a WDM multiplexer for combining said ASE light back into an optical fiber, thereby producing a spectrum-sliced light for a multiple number of WDM channels, whereby said ASE light has a signal-to-noise ratio (SNR) given by:

$$SNR = \frac{Bo}{Be},$$

with $B_o$ being said optical bandwith and $B_e$ being an electrical bandwith of a receiving system.

19. The system of claim 18, wherein the SNR is approximately equal to 18 dB.

20. The system of claim 18, further comprising a channel spacing ($B_a/N$) equal to 3 times the optical bandwidth ($B_o$), with $B_a$ being a predetermined bandwidth of said EDFA, and N being a predetermined number of channels.

* * * * *